United States Patent
Gross et al.

(10) Patent No.: US 6,780,392 B2
(45) Date of Patent: Aug. 24, 2004

(54) METHOD AND DEVICE FOR CONVERTING HYDROGEN SULFIDE INTO ELEMENTAL SULFUR

(75) Inventors: Gerhard Gross, Willich (DE); Vincenzo Spitaleri, Castenaso (IT)

(73) Assignee: Air Liquide Deutschland GmbH (DE)

( * ) Notice: Subject to any disclaimer, the term of this patent is extended or adjusted under 35 U.S.C. 154(b) by 610 days.

(21) Appl. No.: 09/403,081

(22) PCT Filed: Apr. 17, 1998

(86) PCT No.: PCT/EP98/02297

§ 371 (c)(1),
(2), (4) Date: Jan. 24, 2000

(87) PCT Pub. No.: WO98/49098

PCT Pub. Date: Nov. 5, 1998

(65) Prior Publication Data

US 2002/0031468 A1 Mar. 14, 2002

(30) Foreign Application Priority Data

Apr. 30, 1997 (DE) .......................................... 197 18 261

(51) Int. Cl.$^7$ .......................... C01B 17/04; B01D 50/00
(52) U.S. Cl. .................... 423/576.8; 422/169; 422/172; 423/574.1
(58) Field of Search ................................ 422/168, 169, 422/172, 182; 423/576.8, 573.1, 574.1

(56) References Cited

U.S. PATENT DOCUMENTS 4,596,699 A * 6/1986 Desgrandchamps et al. ..... 422/160
4,632,818 A * 12/1986 Chen et al. ............. 423/574 R
6,042,803 A * 3/2000 Watson ..................... 423/574.1

FOREIGN PATENT DOCUMENTS

| EP | 0701967 A1 | * | 3/1996 | |
| GB | 2107450 A | * | 4/1983 | |
| NL | 8501901 | * | 2/1986 | .............. 423/576.8 |
| SU | 239262 | * | 7/1969 | .............. 423/576.8 |
| WO | WO 89/12023 A | * | 12/1989 | |

OTHER PUBLICATIONS

"Leading Burner Designs for Sulphur Plants" *Sulphur* No. 224, pp. 23–34., Jan./Feb. 1993.*
"Oxygen Enrichment Enhances Plant Performance" *Sulphur* No. 241, pp. 45–52., Nov./Dec. 1995.*
Kohl et al. *Gas Purification* 4th Ed., Gulf Publishing Co. Houston TX, ISBN 0–87201–314–6, p. 458., 1985.*

* cited by examiner

Primary Examiner—Wayne A. Langel

(57) ABSTRACT

In a process for producing elemental sulfur by combustion of hydrogen sulfide or a hydrogen-sulfide-containing gas, in particular a Claus process, the hydrogen sulfide or the hydrogen-sulfide-containing gas undergoes partial combustion by using a first device in the form of a burner to which usually air is added as an oxidizing agent and which is connected to the combustion chamber. The hydrogen sulfide or the hydrogen-sulfide-containing gas undergoes further combustion by means of a second device in form of at least one nozzle which is also connected to the combustion chamber and through which oxygen or an oxygen containing gas is fed into the combustion chamber, as a result of which the hydrogen sulfide or the hydrogen-sulfide-containing gas is subjected to afterburning and is then fed to a waste-heat boiler and thereafter to one or more reactors.

18 Claims, 1 Drawing Sheet

METHOD AND DEVICE FOR CONVERTING HYDROGEN SULFIDE INTO ELEMENTAL SULFUR

The invention relates to a process and an apparatus for the conversion of hydrogen sulfide ($H_2S$) into elemental sulfur (S).

Sulfur is required in many chemical processes either in elemental form or in the form of sulfuric acid. However, sulfur is highly toxic in the form of sulfur dioxide ($SO_2$) or as hydrogen sulfide. Therefore, there are maximum permissible emission limit values for the sulfur compounds, which are becoming increasingly more stringent worldwide.

Fossil fuels, such as natural gas, coal, oil sand, oil shale and petroleum, comprise organic and inorganic sulfur compounds. It is necessary to remove these sulfur compounds or to convert them into harmless sulfur compounds. To remove the sulfur compounds from fuels and combustion products there exists a multiplicity of physical and chemical conversion processes.

In the case of solid fuels, the sulfur compounds are absorbed after the combustion in the power station as sulfur dioxide by a flue gas desulfurization system using milk of lime and converted into calcium sulfite. By oxidation with the residual oxygen present in the exhaust gas, gypsum is formed as end product.

In the case of liquid fuels, such as diesel fuel or light fuel oil, maximum permissible sulfur contents are prescribed. This is because flue gas desulfurization after possible consumption in engines, for example, can no longer be implemented. The desulfurization of these fuels is carried out in the refineries. The sulfur compounds present in the crude oil are recovered in the distillate, the heavy oil fraction having the highest sulfur concentrations.

The desulfurization is performed using gaseous hydrogen ($H_2$). The organic sulfur compounds are converted in this case into hydrogen sulfide. The hydrogen sulfide, which is present in the gas mixture with hydrogen and other hydrocarbons, is scrubbed out in amine scrubbers as Claus gas or hydrogen sulfide gas at concentrations of up to 90% by volume of hydrogen sulfide. Hydrogen sulfide is also formed in the sour water stripping columns. In this case, hydrogen sulfide is present as aqueous condensate and is stripped out as sour water stripper gas (SWS gas) containing up to 50% by volume of hydrogen sulfide. In addition, up to 50% by volume of ammonia ($NH_3$) can be present, which is formed by decomposition of organic nitrogen compounds.

The combustion of coal or heavy oil in power stations in which the fuel is gasified in advance under an oxygen deficit also produces a hydrogen-sulfide-containing synthesis gas, which is purified prior to the combustion.

Hydrogen sulfide, moreover, occurs at varying concentrations in associated oil field gas and in natural gas at a content of up to 30% by volume and in the off-gas from sewage treatment plants at a content of up to 5% by volume of hydrogen sulfide.

The industrial utilization of hydrogen sulfide is limited. Therefore, it is first converted into elemental sulfur and then in special plants into sulfuric acid. Elemental sulfur is required in the rubber industry. Sulfuric acid is used in the chemical industry.

Direct conversion of sulfuric acid into elemental sulfur is possible by thermal cleavage of hydrogen sulfide, wet oxidation of hydrogen sulfide in a liquid (aqueous) phase and dry oxidation of hydrogen sulfide in the vapor phase.

The direct conversion process most frequently utilized with over 2000 plants worldwide is the Claus process, which was developed as early as 1883. This process is based on a dry oxidation process. A multiplicity of process variants have arisen. All process variants are based on the same fundamental chemical reactions and on the use of a thermal reactor and a catalytic reactor.

The thermal reactor consists of a combustion chamber having a burner, a waste-heat boiler and a first sulfur condenser. The catalytic reactor is constructed to have two or three stages. The stages each have a heater, a catalyst bed and a sulfur condenser.

In the combustion chamber and the catalytic reactors, the fundamental chemical reactions below proceed:

1. $H_2S + 1/2 O_2 + 1.88 N_2 \rightarrow 1/3 SO_2 + 2/3 H_2S + 1/3 H_2O + 1.88 N_2$
2. $1/3 SO_2 + 2/3 H_2S + 1/3 H_2 + 1.88 N_2 \rightarrow S + H_2O + 1.88 N_2$ Overall: $H_2S + 1.2 O_2 + 1.88 N_2 \rightarrow S + H_2O + 1.88 N_2$ The remaining associated gases present due to the process, such as hydrogen, methane, higher hydrocarbons, ammonia, steam, carbon dioxide, react in accordance with their concentrations in a multiplicity of side reactions.

The actual Claus reaction between sulfur dioxide and hydrogen sulfide in which elemental sulfur and steam are formed is reaction 2. This proceeds in the catalyst bed.

Elemental sulfur is additionally directly produced by the thermal cleavage of hydrogen sulfide into sulfur and water in the combustion chamber:

$$H_2S \rightarrow H_2 + \tfrac{1}{2} S_2$$

This reaction is highly endothermic.

In terms of the process, one third of the amount of hydrogen sulfide, usually a mixture of Claus gas and sour water stripper gas, is burnt by the burner substoichiometrically by the combustion air to give one third of sulfur dioxide. The remaining hydrogen sulfide is thermally cleaved in the combustion chamber into sulfur and hydrogen in the temperature range between 900° C. and 1300° C. and is catalytically converted at temperatures between 180° C. and 400° C. in the catalytic reactors together with the unburnt hydrogen sulfide to give elemental sulfur and water. The reaction to give sulfur is optimum when the hydrogen sulfide/sulfur dioxide ratio is two to one. However, the optimum ratio is only reached to an approximation in practice.

The elemental sulfur formed in the combustion chamber is already separated off in the liquid state after cooling the process gas downstream of the waste-heat boiler and in the first sulfur condenser. In the downstream catalytic reactors, the cooled process gas is heated to the necessary reaction temperature prior to entry into the catalysts by the upstream heaters using high-pressure steam or a thermal oil. The sulfur formed by the Claus reaction is likewise separated off in the liquid state in the sulfur condensers.

On account of the varying hydrogen sulfide concentration in the feedgas, in the conventional Claus processes, there are two main variants: the main stream operation for hydrogen sulfide concentrations above 50% by volume and the side stream operation for hydrogen sulfide concentrations between 30% by volume and 50% by volume.

In the main stream operation, the entire quantity of hydrogen sulfide is partially combusted with the combustion air in the combustion chamber. Owing to the thermal cleavage of the hydrogen sulfide in the combustion chamber, a high proportion of sulfur is already separated off in the first sulfur condenser downstream of the waste-heat boiler. For hydrogen-sulfide-rich gas, the degree of sulfur conversion in a three-stage Claus process is 96 to 97%.

Downstream tail gas treatment plants, generally Claus processes having a thermal afterburning, then make it possible to comply with the regulatory limit values dependent on the plant capacity.

In the side stream operation, on account of the low heating value of the hydrogen sulfide gas, the gas stream is divided. At least one third of the hydrogen sulfide gas is burnt with the necessary combustion air in the combustion chamber and the resulting sulfur-dioxide-rich reaction gas is mixed with the remaining hydrogen sulfide gas upstream of the first reactor. In this process, no elemental sulfur is formed in the combustion chamber, since the hydrogen sulfide gas is completely combusted.

At hydrogen sulfide concentrations below 30% by volume, even the sidestream operation is no longer usable, on account of the low heating value. The combustion then becomes unstable. Furthermore, the sidestream operation generally requires an ammonia-free feedgas. Otherwise, the catalysts are contaminated by ammonia via the bypass. When ammonia is present, for example when sour water stripper gas is used, the sour water stripper gas must be burnt separately from the Claus gas in the combustion chamber. These qualities of the feedgas require modified variants of the Claus process.

The existing Claus plants frequently have an insufficient sulfur capacity for a production-related increase in refinery capacity, use of cheaper but higher-sulfur crude oil qualities or for reduced sulfur concentration limit values in the end product. The term "sulfur capacity" here means the amount of sulfur produced per unit time.

In addition to the new construction or conversion of the Claus plant which may be necessary, there is also the possibility of bypassing the bottleneck in the apparatus by the use of oxygen. In these processes, the combustion air is partly or completely replaced by oxygen. By using oxygen, the combustion temperature is increased and the inert gas content is decreased or eliminated. This means that specific process gas volumes and thus the plant pressure drop are decreased. Thus the throughput of the sour water gas and Claus gas can be increased and low-hydrogen-sulfide feed gases having a low heating value and high ammonia content can also be processed in a main stream reactor. The use of oxygen in Claus plants is currently the state of the art.

In the processes currently used, the enrichment of combustion air with oxygen is the easiest to implement. The increase in throughput hydrogen sulfide is proportional to the rate of oxygen fed. The maximum possible oxygen rate is limited by the permissible operating temperatures of the burner, the waste-heat boiler and of the first reactor.

Depending on the boiler present, the maximum permissible oxygen concentration is 27 to 28% by volume, the permissible operating temperatures of the burner, the waste-heat boiler and the first reactor being limiting. The degree of conversion of sulfur is not increased in comparison with the conventional Claus process.

In the COPE process, the combustion air is enriched with oxygen, elevated concentrations at up to 100% by volume of oxygen being able to be achieved. This requires a special burner and an additional circulation fan. In this process, the temperature increase in the combustion chamber and in the waste-heat boiler due to the high oxygen concentration is compensated for by recirculating cold process gas. The process gas is drawn in downstream of the first sulfur condenser and blown into the combustion chamber through the burners to decrease the temperature. The higher process gas rates increase the pressure drop in the combustion chamber and in the waste-heat boiler. In the downstream catalytic reactor stages, the pressure drop is lower on account of the reduced process gas rates.

The Lurgi-oxygen-Claus burner is a burner which can be operated with air, with oxygen, or with air and oxygen as oxidation medium. The maximum possible oxygen concentration is approximately 80% by volume. The Claus gas and the ammonia-containing sour water stripper gas are fed separately. The sour water stripper gas is burnt together with the fuel gas with air in a central burner muffle. The Claus gas is burnt with oxygen and air as oxidation medium by a plurality of twin-concentric individual burners which are symmetrically arranged around the burner muffle. An individual burner consists of a central oxygen nozzle, a concentric Claus gas nozzle and a twin-concentric air nozzle. This arrangement produces individual oxygen/hydrogen sulfide flames which are surrounded by cold air/hydrogen sulfide flames. This controls the temperature in the combustion chamber. Recirculation of cold process gas to decrease the temperature is not necessary even at high oxygen rates.

In the SURE process, oxygen-enriched air or 100% by volume oxygen is likewise used as oxidation medium.

In the SURE dual combustion process, combustion of the hydrogen sulfide is carried out by two combustion chambers which are connected in series and are each equipped with a waste-heat boiler and a sulfur condenser. The hydrogen sulfide gas is burnt with a portion of the oxygen in the first combustion chamber, cooled in a waste-heat boiler, transferred by a burner into the second combustion chamber and the amount of remaining oxygen required for the Claus reaction is added. This apportioning likewise controls the temperature in the combustion chambers.

In the SURE sidestream burner process, a separate combustion chamber is connected upstream of the existing Claus process. The hydrogen sulfide gas is apportioned between the two combustion chambers. In the first combustion chamber, combustion with oxygen produces sulfur dioxide alone. To control the temperature, downstream of the waste-heat boiler, a partial stream of the cooled sulfur-dioxide-containing partial stream is blown into the actual combustion chamber through a burner together with the remaining hydrogen sulfide gas and oxygen in order to set the hydrogen sulfide/sulfur dioxide ratio necessary for the Claus reaction.

The use of up to 100% by volume oxygen as oxidation medium offers the greatest potential for increasing the output of the Claus plants. However, for this purpose, not inconsiderable capital expenditure on plant equipment must be made. In all known oxygen-Claus processes, at least the burners and the combustion chambers must be replaced. Further costs arise if, in addition, a recirculated gas fan or a second combustion chamber with waste-heat boiler and sulfur condenser are required. Furthermore, operating a recirculation fan is not without problems owing to possible sulfur deposits.

However, the high potential operating capacity which is then available can usually not be exploited, since the downstream systems, the catalytic reactors for example, are a bottleneck. In contrast, oxygen enrichment requires the lowest capital expenditure, but with only a maximum of 28% by volume of oxygen in the combustion air, it offers the lowest potential for increase in the efficiency of a Claus plant.

The object therefore underlying the invention was to overcome the disadvantages of the prior art and to provide a process and an apparatus by which in particular the operating capacity and the degree of conversion of hydrogen sulfide to elemental sulfur are improved. The process and the apparatus, furthermore, are to be able to be integrated into existing Claus plants with comparatively low additional expenditure.

The object is achieved by a process having the features according to claim 1 and an apparatus having the features as described in claim 16. Preferred developments are specified in the subclaims.

The process according to the invention has the advantage that the sulfur capacity of Claus plants is increased with the use of oxygen or an oxygen-rich gas, with only low capital costs being necessary. However, at the same time, substantially higher oxygen concentrations or hydrogen sulfide throughputs are possible in comparison with a conventional oxygen enrichment.

According to the invention, the oxygen is not used solely as oxidation medium as hitherto, but is additionally used to increase the mixing energy in order to improve the mixing between oxidizing agent and feedgas in the existing combustion chamber. By increasing the mixing energy, the combustion density and thus the throughput of hydrogen sulfide can be increased. This is because this integrates, into the existing combustion chamber, an additional afterburning zone which is produced by highly turbulent self-priming oxygen jets. The process gas which is partially reacted with air or premixed and is exiting from the combustor or the burner is thus subjected to complete afterburning. Furthermore, the reactions taking place in the combustion chamber proceed closer to the thermodynamic equilibrium. The terms "partial combustion" and "afterburning" relate to the stoichiometric combustion.

Instead of technical-grade oxygen which is supplied compressed by pipeline or is taken off at high pressure in the liquid state from vacuum-insulated containers, oxygen having a purity of 80% by volume to 100% by volume oxygen content can also be used. This is preferably produced directly on-site by molecular sieve adsorption systems, for example vacuum swing adsorption systems (VSA) or pressure vacuum swing adsorption systems (PVSA).

The additional oxygen is, according to the invention, not added as hitherto via the burner by enriching the combustion air, but is preferably blown in at high velocity through at least one or a multiplicity of individual nozzles. These are, depending on the existing construction of the combustion chamber, installed symmetrically distributed in the combustion chamber wall in the transition region to the combustor or downstream of the burner at the beginning of the combustion chamber.

The process gas which is exiting from the combustor or the burner and is substoichiometrically burnt or premixed with the combustion air of the burner is, owing to the intensive mixing with the oxygen, subjected to complete afterburning and the stoichiometric hydrogen sulfide/sulfur dioxide ratio of two to one which is required for the Claus reaction is set, the hydrogen sulfide/sulfur dioxide ratio being measured upstream of the tailgas treatment system.

For intensive mixing, the exit velocities from the individual oxygen nozzles are preferably in a Mach number range between 0.4 and 2. Mach number (Ma) is here taken to mean the ratio of the nozzle exit velocity to the speed of sound of the gases. On account of the relatively high exit velocity of the oxygen, highly turbulent free jets are formed which draw in surrounding combustion chamber atmosphere, mix and react with the combustible constituents. The hydrogen sulfide in this case is burnt to sulfur dioxide.

At an exit velocity corresponding to a Mach number of one, that is the speed of sound, for example, on account of the intensive mixing, the stoichiometric hydrogen sulfide/sulfur dioxide ratio of two to one is established. This means, the oxygen present in the combustion chamber is completely reacted. The complete reaction of the oxygen increases the service life of the first catalytic reactor. This is because at reactor temperatures of 380° C. to 550° C., the excess oxygen otherwise present in Claus plants reacts with the sulfur dioxide present to form sulfur trioxide ($SO_3$) which reacts with the aluminum oxide catalyst pellets according to the following reaction equation:

$$Al_2O_3 \rightarrow Al_2SO_4 + O_2$$

Aluminum sulfate forms, which coats the catalyst surface and thus inactivates the catalyst.

Furthermore, at oxygen velocities corresponding to a Mach number of 1, the oxygen nozzles are thermally relieved, since the flames of the hydrogen sulfide/sulfur dioxide free jet diffusion flames do not stabilize on the nozzle, but burn free in the combustion chamber, lifted off from the nozzle. In addition, the flame routes are thus displaced from the oxygen nozzles into the combustion chamber. The absolute oxygen pressure at the nozzle exit necessary for an oxygen velocity corresponding to a Mach number of 1 should preferably be 1.93 times the pressure prevailing in the combustion chamber (PBRK).

The angle of inclination of the oxygen injection lances is preferably 45° to 90° to the direction of flow, the axes of the oxygen jets intersecting the central axis of the combustion chambers. The oxygen injection lances are advantageously installed into the inner wall of the combustion chambers with the nozzles flush or recessed.

In the case of burners which produce swirling flames, that means which have a radial velocity and concentration distribution of the individual gas components on the combustion chamber, the oxygen injection lances are preferably installed distributed symmetrically around the periphery preferably at a distance of approximately 0.25 of the combustion chamber diameter, measured from the center of the combustion chamber. This produces an oxygen swirled flow directed against the swirl of the main flame.

The oxygen injection lances are preferably concentric, the oxygen nozzle being surrounded by a ring-gap nozzle. A protective gas having a minimum exit velocity corresponding to a Mach number of 0.2 is advantageously permanently blown into the combustion chamber through the ring-gap nozzle, in order to cool the oxygen nozzle and to protect against sulfur diffusing in.

The protecting gas used is preferably air, nitrogen or carbon dioxide.

Experiments have shown that, using this process, depending on the hydrogen sulfide concentration, equivalent oxygen concentrations ($XO_2$) of 21% by volume to 40% by volume of oxygen can be achieved. The equivalent oxygen concentration is described here by the equation $$(XO_2) = O_2 \text{ total}/(\text{air} + O_2 \text{ additional}).$$

The rates of Claus gas and sour water stripper gas are increased in accordance with the oxygen supply.

EXAMPLES

The examples below show that the temperature in the combustion chamber increases on account of the high equivalent oxygen concentration and combustion density. More steam is produced in the waste-heat boiler on account of the higher amount of waste heat (see table).

|  |  | Example 1 | Example 2 | Example 3 |
|---|---|---|---|---|
| Claus gas | kg/h | 442 | 603 | 706 |
| SWS gas | kg/h | 240 | 259 | 246 |
| Air, total | kg/h | 1515 | 1222 | 797 |
| Oxygen | kg/h | 0 | 71 | 146 |
| Combustion chamber temp. | °C. | 1213 | 1331 | 1415 |
| Waste-heat boiler temp. | °C. | 597 | 617 | 641 |
| Burner temperature | °C. | 297 | 259 | 268 |
| Reactor temp. R1 | °C. | 355 | 387 | 395 |
| $H_2S/SO_2$ ratio |  | 2.08 | 2.01 | 2.01 |
| Sulfur capacity | % | 100 | 126 | 142 |

$X_{Claus\text{-}gas}$ = 85% by volume, $X_{SWS\text{-}gas}$ = 46% by volume

In the event of an increase of the permissible combustion chamber temperature of 1500° C., the equivalent oxygen concentration can be increased to at least 40% by volume. Since heat and mass are exchanged equally rapidly, the temperature in the combustion chamber is evened out at a higher level as a result of the intensive mixing and the heat transfer to the combustion chamber wall is improved. This means that the amount of heat released to the surroundings via the combustion chamber wall is greater. The waste-heat boiler is thermally relieved. The temperatures at the burner and in the combustor do not increase.

The process causes the temperatures to increase due to the higher sulfur conversion in the catalytic reactor, with the permissible operating temperature of the catalyst of up to 650° C. being able to be exploited. The high combustion temperatures when oxygen is used have beneficial effect on the thermal cleavage and complete combustion of higher hydrocarbons and ammonia, in which case, in particular, a minimum temperature of 1350° C. should be maintained for complete cleavage and combustion of ammonia. Owing to the lack of nitrogen ballast, at an equivalent oxygen concentration of 40% by volume, the concentration of hydrogen sulfide gas in the gas mixture used can be decreased to 20% by volume of hydrogen sulfide.

BRIEF DESCRIPTION OF THE DRAWINGS

FIGS. 1 to 3 show a burner and the section connected thereto of the combustion chamber or combustion chamber of a Claus plant, the burner shown in FIG. 1 and FIG. 2 additionally having a combustor.

FIG. 1 shows the burner (1) to which are fed via a 3-fold concentric tube (2) having an inner pilot tube (3) a fuel gas via the middle tube (4) and the Claus/SWS gas via the outer tube (5). Air is passed into the burner (1) via line (6). The combustion takes place in the combustor (7) and combustion chamber (8) connected thereto. According to the invention, oxygen is introduced at high velocity into the combustion chamber via a nozzle (9). In addition, it is shown here that the lance for introducing the oxygen (10) consists in its front region of a twin-concentric tube, the oxygen being introduced by the inner tube (11) and a protecting gas to cool the nozzle (9) being introduced via the outer tube (12). The angle "β" here denotes the angle of inclination of the oxygen lance in relation to the direction of flow (R). The angle "β" according to the invention is in the range from 45° (β) and 90° (β'). Combustor (7) and combustion chamber (8) are here a one-piece construction.

FIG. 2 shows a similar embodiment as FIG. 1, combustor (7) and combustion chamber (8) being separate from one another. The burner (1) has a three-fold concentric tube (2) having an inner tube (3) for pilot gas, a middle tube (4) for fuel gas and an outer tube (5) for Claus/SWS gas. Air is fed via a line (6). A combustor (7) is arranged upstream of the combustion chamber (8). Oxygen and a protecting gas are fed via a twin-concentric tube, the oxygen being conducted in the inner tube (11) and the protecting gas in the outer tube (12). The oxygen lance is at an angle β to β' (45° to 90°) to the direction of flow (R).

In FIG. 3, the combustion chamber (8) is directly connected to the burner (1) of the Claus plant. In this embodiment, the pilot gas is introduced into the burner via a separate tube (13).

Figure 1:
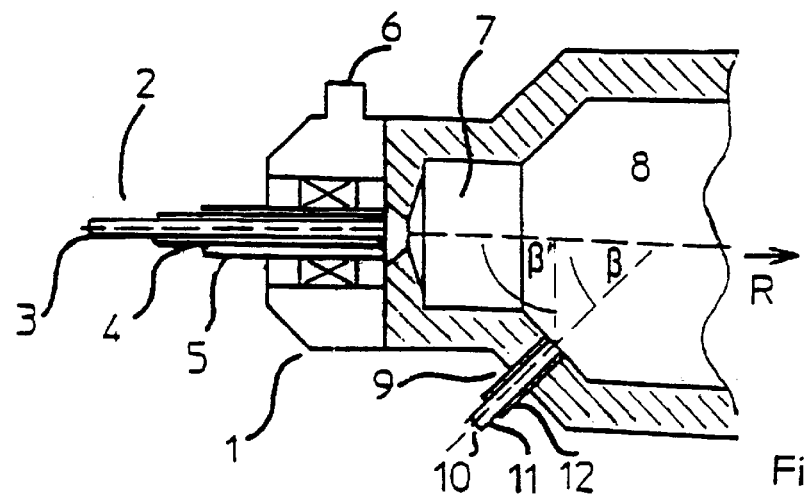
FIG. 1 shows a section of a combustion chamber to which are connected a lance for introducing oxygen into the combustion chamber and a burner comprising a combustor according to a first embodiment of the invention.
Figure 2:
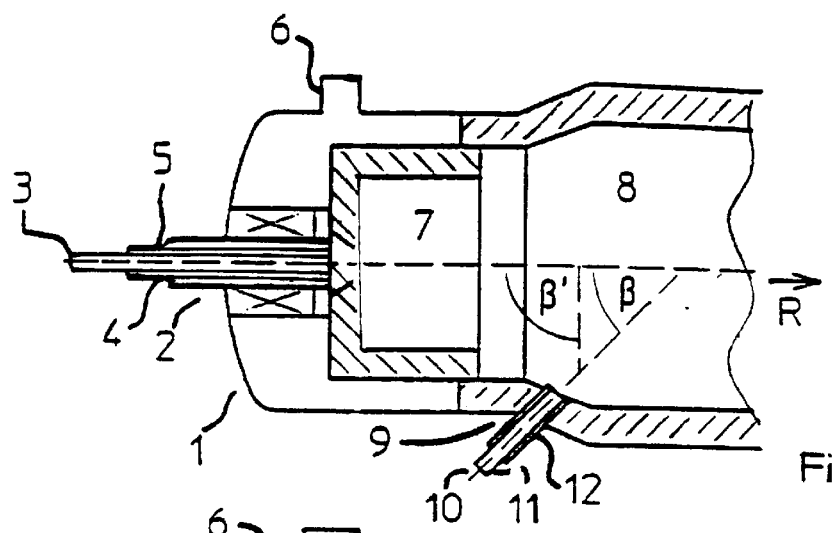
FIG. 2 shows a section of a combustion chamber to which are connected a lance for introducing oxygen into the combustion chamber and a burner comprising a combustor according to a second embodiment of the invention.
Figure 3:
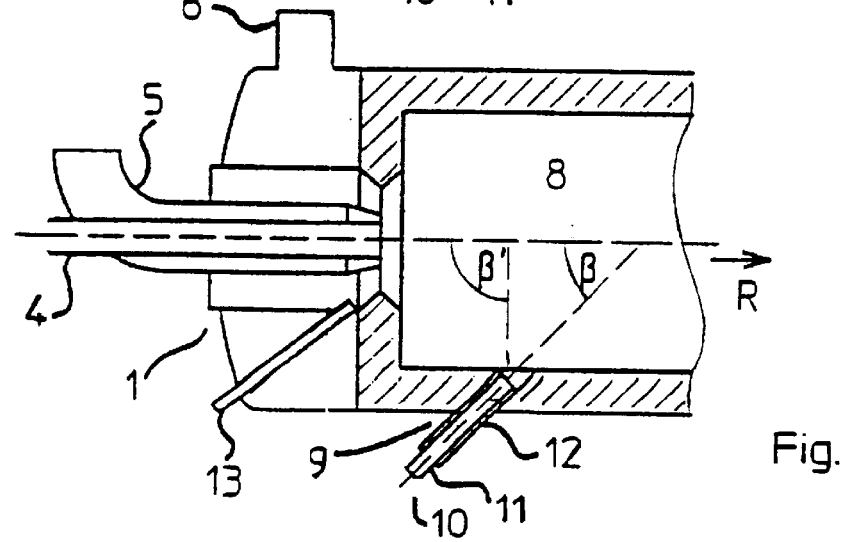
FIG. 3 shows a section of a combustion chamber to which are connected a lance for introducing oxygen into the combustion chamber and a burner according to a third embodiment of the invention.

What is claimed is:

1. In a process for producing elemental sulfur by combustion of hydrogen sulfide or a hydrogen sulfide-containing gas in a combustion whereby the hydrogen sulfide or the hydrogen sulfide-containing gas is treated by partially combusting with addition of air as the oxidation medium, subjecting the partially combusted hydrogen sulfide or hydrogen sulfide-containing gas to afterburning by adding an oxygen-containing gas to the partially combusted gas, and feeding the reaction gas mixture to a waste-heat boiler and thereafter to one or more catalytic reactors, characterized in that an afterburning zone is intergrated into the combustion reactor located downstream and separate from a burner by feeding the oxygen-containing gas directly into the combustion reactor by a multiplicity of individual nozzles, and feeding the oxygen-containing gas into the combustion reactor at an intake velocity in the range between Mach number 0.4 and 2.

2. The process as claimed in claim 1, in which the oxygen-containing gas has a concentration of 80% by volume to 100% by volume of oxygen.

3. The process as claimed in one of claim 1, in which the intake velocity of the oxygen-containing gas into the combustion reactor is in the range of a Mach number between 0.4 and 2, as a result of which the mixing between the oxygen containing gas, the combustion air and the hydrogen-sulfide-containing process gas is increased.

4. The process as claimed in claim 1, in which the air combusts the fuel in the burner to form a flame which enters into the combustion reactor in a flowing direction and the oxygen-containing gas enters into the combustion reactor at an angle of 45° to 90° inpinged against said flowing direction.

5. The process as claimed in claim 4, in which, in the case of a process having swirl of the main flame in the combustion reactor, a swirl flow of the oxygen-containing gas is produced which impinges against the swirl of the main flame.

6. The process as claimed in claim 1, in which the entry point of the oxygen-containing gas into the combustion chamber is cooled and is protected against sulfur diffusing in.

7. The process as claimed in claim 6, in which, for cooling and protecting, a protecting gas is fed to the combustion reactor in the region of the point of entry of the oxygen-containing gas into the combustion reactor.

8. The process as claimed in claim 6, in which air, nitrogen or carbon dioxide is used as the protecting gas.

9. The process as claimed in claim 7, in which the intake velocity of the protective gas into the combustion chamber is at least Mach number 0.2, as a result of which the turbulent mixture between the oxygen containing gas, the combustion air and the hydrogen-sulfide-containing process gas is additionally increased.

10. The process as claimed in claim 1, in which the rate of oxygen fed is controlled in accordance with the stoichiometry of a Claus reaction in such a manner that the oxygen and the combustion air react completely with hydrogen sulfide and the other combustible gases so that no excess oxygen is present downstream of the combustion chamber.

11. The process as claimed in claim 1, in which the rate of oxygen fed is controlled in accordance with the stoichiometry of a Claus reaction in such a manner that the maximum temperatures in the burner is 2500 C. and that the maximum temperature in the combustor is 12000 C. and the maximum temperature in the combustion reactor is 15000 C., so that the heat transfer to the combustion reactor wall is minimized and the maximum temperature in the waste-heat boiler is 6700 C.

12. The process as claimed in claim 1, in which the concentration of oxygen in the oxygen-containing gas (equivalent oxygen concentration) is between 21 and 40% by volume.

13. The process as claimed in claim 1, in which the concentration of the hydrogen sulfide in the feed gas is at least 20% by volume.

14. An apparatus for producing elemental sulfur by combustion of hydrogen sulfide or a hydrogen sulfide-containing gas, comprising a combustion reactor to which a burner is fixed in which the hydrogen sulfide or the hydrogen sulfide-containing gas is partially combusted with addition of air, a waste-heat boiler and one or more catalytic reactors, characterized in that a multiplicity of nozzles are directly fixed to the combustion reactor downstream from the burner, through which an oxygen-containing gas is fed into the combustion reactor, as a result of which the hydrogen sulfide or the hydrogen sulfide-containing gas is subjected to afterburning.

15. An apparatus as claimed in claim 14, in which the nozzles, in the installed state, are arranged flush or recessed in the refractory brick lining of the combustion reactor.

16. The apparatus as claimed in claim 14, in which in the case of a process having a swirled main flame in the combustion reactor the nozzle is installed tangentially at a distance from the center of the combustion reactor which corresponds to 0.25 times the diameter of the combustion reactor, so that a swirl flow of the oxygen or oxygen-containing gas is produced which is impingesd against the swirl of the main flame.

17. The apparatus as claimed in claim 14, in which a ring-gap nozzle is arranged around the nozzles for blowing in the oxygen or the oxygen-containing gas, through which ring-gap nozzle a protective gas is additionally blown in.

18. The apparatus as claimed in claim 14, in which the multiplicity of nozzles are symmetrically installed in the combustion reactor wall.

* * * * *